(12) United States Patent
Bagropoulos et al.

(10) Patent No.: US 10,467,283 B2
(45) Date of Patent: Nov. 5, 2019

(54) METHOD AND SYSTEM FOR PRODUCT RECOGNITION

(71) Applicant: CHANNELSIGHT LIMITED, Dublin (IE)

(72) Inventors: Georgios Bagropoulos, Brasov (RO); Petros Alvanitopoulos, Salonika (GR); Adrian Moroi, Brasov (RO); Kieran Dundon, Wicklow (IE)

(73) Assignee: CHANNELSIGHT LIMITED, Dublin (IE)

( * ) Notice: Subject to any disclaimer, the term of this patent is extended or adjusted under 35 U.S.C. 154(b) by 0 days.

(21) Appl. No.: 15/562,902

(22) PCT Filed: Mar. 11, 2016

(86) PCT No.: PCT/EP2016/055373
§ 371 (c)(1),
(2) Date: Sep. 29, 2017

(87) PCT Pub. No.: WO2016/156017
PCT Pub. Date: Oct. 6, 2016

(65) Prior Publication Data
US 2018/0081877 A1    Mar. 22, 2018

(30) Foreign Application Priority Data
Mar. 31, 2015   (EP) .................................. 15162066

(51) Int. Cl.
*G06T 7/00*   (2017.01)
*G06F 16/583*   (2019.01)
(Continued)

(52) U.S. Cl.
CPC .......... *G06F 16/5838* (2019.01); *G06K 9/46* (2013.01); *G06K 9/4652* (2013.01);
(Continued)

(58) Field of Classification Search
None
See application file for complete search history.

(56) References Cited

U.S. PATENT DOCUMENTS 7,356,190 B2 *  4/2008  Mizoguchi  .........  G06K 9/00234
                                                       358/518
7,574,020 B2 *  8/2009  Shamaie  ............  G06K 9/00355
                                                       345/594

(Continued)

OTHER PUBLICATIONS

Duda et al.; Pattern Classification; Wiley & Sons, Inc.; 2nd Edition; 38 pgs.; retrieved from the Internet (https://www.researchgate.net/publication/228058014) on Nov. 9, 2018; (year of pub sufficiently earlier than effective US filed and any foreign priority date) 2001.

(Continued)

*Primary Examiner* — Delomia L Gilliard
(74) *Attorney, Agent, or Firm* — Shumaker, Loop & Kendrick, LLP; William A. Ziehler (57) ABSTRACT

A method of product recognition, comprising decomposing a product image of into a set of frequency components; performing a frequency analysis for each frequency component in the set of frequency components; detecting a plurality of edge pixels of the image based on the frequency analysis; selecting a set of interested pixels in the region of each of the plurality of edge pixels; creating a quantized product image; and creating a normalized histogram of the quantized image using the sets of interested pixels selected for each of the plurality of edge pixels, wherein product recognition is based on similarities between the normalized histogram of the quantized image and images of similar products in a database of products.

16 Claims, 5 Drawing Sheets

(51) Int. Cl.
  *G06K 9/46*     (2006.01)
  *G06K 9/62*     (2006.01)
  *G06T 7/13*     (2017.01)
  *G06T 7/136*    (2017.01)
  *G06Q 30/00*    (2012.01)
  *G06T 3/40*     (2006.01)
  *G06T 5/00*     (2006.01)

(52) U.S. Cl.
  CPC ........... *G06K 9/6215* (2013.01); *G06Q 30/00* (2013.01); *G06T 3/4007* (2013.01); *G06T 5/002* (2013.01); *G06T 7/13* (2017.01); *G06T 7/136* (2017.01)

(56) References Cited

U.S. PATENT DOCUMENTS

2006/0088207 A1\* 4/2006 Schneiderman ... G06K 9/00241
                                                    382/159
2017/0262962 A1\* 9/2017 Rad .................... G06F 17/18

OTHER PUBLICATIONS

Fan-Jie et al.; Image Retrieval Based on 2D Histogram of Interest Points; 2009 Fifth Intl. Conf. on Info Assurance and Security; pp. 250-253; Aug. 2009.

Gatos et al.; Adaptive Degraded Document Image Binarization; Pattern Recognition; 39(3); pp. 317-327; Mar. 1, 2006.

Huang et al.; The Empirical Mode Decomposition and the Hilbert. Spectrum for Nonlinear and Non-Stationary Time Series Analysis; Proc. Royal Soc. Lond. A: Math., Phys. and Eng. Sci. 454(1971); pp. 903-995; Mar. 8, 1998.

Kavitha et al.; Object Based Image Retrieval from Database Using Combined Features; 2014 Fifth Intl. Conf. on Signal and Image Processing; pp. 161-165; Jan. 2014.

Liang et al.; An Edge Detection Algorithm of Image Based on Empirical Mode Decomposition; 2nd Intl. Symp. on Intelligent Info Tech App; vol. 1; pp. 128-132; Dec. 20, 2008.

Liang et al.; Edge Detection via Window Empirical Mode Decomposition; 2012 9th Int'l Conf on Fuzzy Sys and Knowledge Discovery (FSKD 2012); pp. 1783-1786; May 29, 2012.

Rudinac et al.; Entropy Based Method for Keypoint Selection; IAPR Conf on Machine Vision Apps; 5 pgs.; May 2009.

Sauvola et al.; Adaptive Document Image Binarization; Pattern Recognition; 33(2); pp. 225-236; Feb. 29, 2000.

Wang et al.; Robust Image Retrieval Based on Color Histogram of Local Feature Regions; Multi-media Tools and Apps; 49(2): pp. 323-345; Oct. 2010.

Zou et al.; Research on Product image Retrieval with Local Features; 2010 Chinese Conf on Pattern Recognition (CCPR); pp. 1-5; Oct. 2010.

\* cited by examiner

METHOD AND SYSTEM FOR PRODUCT RECOGNITION

TECHNICAL FIELD

The invention herein is directed to a method and system for automatic product recognition.

BACKGROUND ART

Product Recognition is a challenging task. Increasingly, users buy products on-line, for example from well-known e-commerce web sites such as Amazon, Newegg or Walmart. This increase in on-line trade has resulted in a corresponding increase in the interest of suppliers and manufacturers in these online forums and indeed a desire for product coverage in these forums. As a result there is increased investment in information technology in order to increase sales by means of implementing efficient product search services. A popular method is to offer straightforward web-services in order not only to find the reviews, specifications availability and prices of products from different retailers but also to purchase them.

The evolution in portable electronic devices, such as smartphones and tablets, provides a perfect environment for on-line shopping. The goal of web services implemented on these devices is to provide an attractive and alternative environment for searching for product information and proceed to purchase these products.

Content Based Image Retrieval (CBIR) is increasingly used for product comparison to improve the search and retrieval of product information by looking at the content of images in order to return results that match a particular query. The emerging field of Product Image Retrieval (PIR) breaks the product recognition problem into two categories: systems where users get online information regarding a product by snapping a picture of a product with a camera-device (smartphone or tablet) and systems where a vertical search is performed based on domain-specific search such as "Philips TV" domain. In the latter case, focused crawlers/parsers extract the informative content from web product-pages and try to recognize the product by taking into consideration text content and corresponding product images that appear in the web product page. Almost all the existing PIR approaches involve CBIR techniques. However, it is desirable to provide an improved method of CBIR which extracts informative content from web pages and automatically and efficiently recognizes the product from webpages under consideration. It is further desirable to provide a real time and accurate CBIR system for the representation of images, which reduces the feature vector while at the same time maintaining accuracy through a large set of features.

SUMMARY OF INVENTION

The present invention as described herein with reference to the appended claims provides an improved and more efficient method and apparatus for content based image retrieval.

A first embodiment of the present invention includes a method of product recognition, comprising decomposing a product image into a set of frequency components; performing a frequency analysis for each frequency component in the set of frequency components; detecting a plurality of edge pixels of the image based on the frequency analysis; selecting a set of interested pixels in the region of each of the plurality of edge pixels; creating a quantized product image; and creating a normalized histogram of the quantized image using the sets of interested pixels selected for each of the plurality of edge pixels, wherein product recognition is based on similarities between the normalized histogram of the quantized image and images of similar products in a database of products.

Each frequency component may be an intrinsic mode function.

The method proposed reduce the complexity of the feature vectors and provides efficient matching while minimizing overhead. The use of frequency components facilitates the extraction of the most informative components and thus provides accurate matching.

Performing a frequency analysis may comprise obtaining local intensity thresholds and spatial frequencies for each frequency component or IMF in the set of frequency components or IMF.

Decomposing the product image may comprise: converting the product image to a Hue, Saturation and Value, HSV, colour space; extracting a Value channel of the HSV colour space; and applying a derivative of Gaussian filter to the extracted Value channel; decomposing the images derived from the application of the derivative of Gaussian filter in a horizontal and vertical orientation into a first independent mode function representative of the horizontal orientation and a second independent mode function representative of the vertical orientation of the Value channel.

Obtaining spatial frequencies for each frequency component may further comprise estimating a spatial frequency for each pixel associated with each frequency component and wherein detecting the plurality of edge pixels is based either on local intensity thresholds or the estimated spatial frequencies.

Selecting the set of interested pixels may comprise:
for each of the plurality of edge pixels:
applying a window having a constant size to each edge pixel to determine a set of pixels in the region of the edge pixel;
calculating an entropy associated with each of the pixels in the set of edge pixels;
selecting the set of interested pixels having maximum entropy;

Decomposing the images derived from the application of derivative of Gaussian filter may further comprise applying Empirical Mode Decomposition, EMD, to a response image from derivative of Gaussian filter.

EMD may comprise one dimensional, 1D, EMD.

Estimating the spatial frequency may comprise applying Hilbert Spectral Analysis to each frequency component.

Detecting a plurality of edge pixels of the image may comprise detecting a plurality of extrema in each frequency component.

The plurality of extrema may comprise a plurality of maxima and minima pixels of the images derived from the application of the derivative of Gaussian filter in a horizontal and vertical orientation.

Detecting a plurality of edge pixels may comprise comparing on the values of the spatial frequencies between each of the plurality of maxima and minima pixels and their adjacent pixels in the derived images.

Creating a quantized image may comprise quantizing the image using a set of perceptual colours.

The set of perceptual colours may comprise 25 colours.

EMD may comprise at least one of Window Empirical Mode Decomposition and bi-dimensional EMD.

The methods described above may further comprise applying a Hilbert-Huang transform to value channel.

Detecting the plurality of edge pixels may further comprise pre-processing the value channel.

In addition, the methods above may further comprising classifying a plurality of pixels associated with the value channel into a plurality of foreground and background clusters.

Classifying may comprise applying Sauvola's thresholding to the value channel to extract a binary image.

The above methods may further comprise determining the background surface of the binary image and interpolating corresponding values of the background surface to determine the foreground pixels.

The method may further comprising estimating a final image taking into account the extracted binary image and the background surface.

The final image may be estimated based on a distance value between the binary image and the background surface.

Estimating may comprise comparing the distance value with a threshold and wherein a foreground pixel is determined if the distance value is greater than the threshold.

A further embodiment of the present invention includes a system for product recognition, comprising means for decomposing a product image into a set of frequency components; means for performing frequency analysis for each frequency component in the set of frequency components; means for detecting a plurality of edge pixels of the image based on the frequency analysis; means for selecting a set of interested pixels in the region of each of the plurality of edge pixels; means for creating a quantized product image; and means for creating a normalized histogram of the quantized image using the sets of interested pixels selected for each of the plurality of edge pixels, wherein product recognition is based on similarities between the normalized histogram of the quantized image and images of similar products in a database of products.

Means for performing a frequency analysis may comprise means for obtaining local intensity thresholds and spatial frequencies.

Means for decomposing the product image may comprise:
means for converting the product image to a Hue, Saturation and Value, HSV, colour space;
means for extracting a Value channel of the HSV colour space;
means for applying a derivative of Gaussian filter to the extracted Value channel;
means for decomposing the images derived from the application of the derivative of Gaussian filter in a horizontal and vertical orientation into a first independent mode function representative of the horizontal orientation and a second independent mode function representative of the vertical orientation of the Value channel.

Means for obtaining spatial frequencies for each frequency component may further comprise means for estimating a spatial frequency for each pixel associated with each frequency component and wherein detecting the plurality of edge pixels is based either on local intensity thresholds or the estimated spatial frequencies.

Means for selecting the set of interested pixels comprises:
for each of the plurality of edge pixels:
means for applying a window having a constant size to each edge pixel to determine a set of pixels in the region of the edge pixel;
means for calculating an entropy associated with each of the pixels in the set of edge pixels;
means for selecting the set of interested pixels having maximum entropy;

Means for decomposing the images derived from the application of derivative of Gaussian filter may further comprise means for applying Empirical Mode Decomposition, EMD, to a response image from derivative of Gaussian filter.

EMD may comprise one dimensional, 1D, EMD.

Estimating the spatial frequency may comprise applying Hilbert Spectral Analysis to each frequency component.

Detecting a plurality of edge pixels of the image may comprise means for detecting a plurality of extrema in each IMF.

Means for detecting a plurality of edge pixels may comprise means for comparing on the values of the spatial frequencies between each of the plurality of maxima and minima pixels and their adjacent pixels in the derived images.

Means for creating a quantized image comprises means for quantizing the image using a set of perceptual colours.

The set of perceptual colours may comprise 25 colours.

EMD may comprise at least one of Window Empirical Mode Decomposition and bi-dimensional EMD.

The system may further comprise means for applying a Hilbert-Huang transform to value channel.

Means for detecting the plurality of edge pixels may further comprise means for pre-processing the value channel.

The system above may further comprise means for classifying a plurality of pixels associated with the value channel into a plurality of foreground and background clusters.

In a configuration means for classifying may comprise means for applying Sauvola's thresholding to the value channel to extract a binary image.

The system may further comprise means for determining the background surface of the binary image and interpolating corresponding values of the background surface to determine the foreground pixels.

The system may further comprise means for estimating a final image taking into account the extracted binary image and the background surface.

The final image may be estimated based on a distance value between the binary image and the background surface.

Means for estimating may comprise comparing the distance value with a threshold and wherein a foreground pixel is determined if the distance value is greater than the threshold.

The above system further comprises:
means for creating a crawl session directed to a predefined website;
means for navigating to the predefined website and extracting a product page from the predefined website;
means for processing source code from the predefined website and means for extracting informative content from the product page;
means for verifying a recognised product; and
a graphical user interface.

The informative content may include at least one of product title, price, description, availability, metadata and/or product images.

Verifying a recognised product may comprise applying a text analysis process.

The graphical user interface may comprise an interface for at least one of product querying, product purchasing, product description and/or price lists.

There is also provided a computer program comprising program instructions for causing a computer program to carry out the above method which may be embodied on a record medium, carrier signal or read-only memory.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning consistent with the particular concepts disclosed herein.

BRIEF DESCRIPTION OF DRAWINGS

The invention will be more clearly understood from the following description of an embodiment thereof, given by way of example only, with reference to the accompanying drawings, in which:—

DESCRIPTION OF EMBODIMENTS

The aspects of the technology mentioned above, as well as additional aspects, will now be described in greater detail. The aspects may be used individually, all together or in any combination of two or more, as the technology is not limited in this respect.

Figure 1:
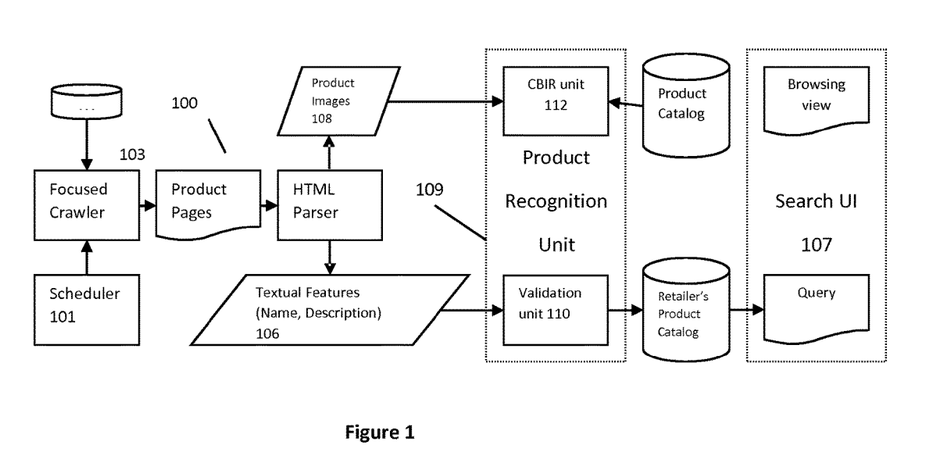
FIG. 1 describes a system for content based image retrieval in accordance with the present invention FIG. 2 describes an edge detection process in accordance with an embodiment of the present invention

As shown in FIG. 1, a product recognition system, 100, in accordance with the present invention includes a Scheduler, 101, a Focused Crawler, 103, a HTML-Parser, 105, a Search UI component, 107 and a Product Recognition Unit, 109. The Product Recognition Unit 109 comprises a Content Based Image Retrieval Unit 112 and a Validation unit 110. It will be appreciated that the system herein is merely exemplary and individual components may be combined.

The Scheduler 101, in accordance with FIG. 1, has the responsibility for creating crawl sessions which are devoted to particular websites. The Focused Crawler 103 is arranged to navigate to websites and extract relevant product in response to a search query entered on the Search User Interface 107. The Search User Interface 107 may be a Graphical User Interface which is configurable to include any number of feature such as product querying, product purchasing, product description or price lists for relevant products. The Graphical User Interface is also configurable to return the results of product recognition. The results of product recognition may be reorganised into any preferred configuration for example, highest price first, lowest price first or using previous ratings and reviews, or any other sorting mechanism which may be required. Additional filtering may also be provided, for example filtering based on stock levels at relevant retailers.

The HTML Parser 105 is arranged to process source code from an extracted product page and select informative content therefrom. This informative content may include textual features 106 product data such as product title, price, description, availability and metadata and product images, 108.

The validation unit 110 verifies a matching decision returned by the content based image retrieval unit prior to results being returned to the graphical user interface 107.

The product recognition unit 109 incorporates the content based image retrieval techniques in accordance with the present invention and analyses images in order to present them in a feature space where the similarity between images is more effective. In general, the CBIR process implies several challenging issues, including analysis of low level features (e.g. colour, shape, texture, spatial layout, etc.) and creation of feature vectors. It will be appreciated that the size of the feature vector affects the quality and speed of the CBIR system. It will be appreciated that compromising these factors is key to retaining efficient Content Based Image Recognition, CBIR. Thus the real-time and accurate CBIR is a system, which requires a small sized feature vector, while at the same time maintaining accuracy through a large set of features.

Product Recognition (PR) systems generally fall in two categories:
1. Systems where users get online information for a product by snapping a picture with a camera-device.
2. Systems where a vertical search is performed based on the knowledge of a focused domain.

The system described herein focuses on the second category, however it will be appreciated that the invention is not restricted as such. The focussed web crawler 103 extracts the informative content from web product-pages and the Product Recognition Unit 109 recognizes a product by taking into consideration text content and the proposed Content Based Image Retrieval (CBIR) techniques described herein. It will be appreciated that alternative CBIR may be combined with text content for extracting informative content. Conventional CBIR methods analyse images using the following features:

Colour,
Shape,
Texture,
Spatial layout

As described herein only colour is used as a feature for image retrieval, techniques. It will be appreciated that colour is a statistical feature with low computational cost and thus is invariant to rotation and scale of image seen. Colour is further invariant to any displacement of objects within an image. The methods described herein result in an order of magnitude speed improvement. The present invention also proposes the use of 25 perceptual colours. This further speeds up the retrieval of matching products. In comparison, alternative techniques such as SCD, EH and FCTH represent images using 256 features (SCD), 80 (EH) and 192 (FCTH).

Product recognition, as described herein, incorporates empirical mode decomposition (EMD) for image filtering. Further a local threshold technique as further described below, rather than a global threshold provides an improved quality of image edges.

In use, a user using the search user interface in a browser profile and enters a query, for example detail of a product they wish to purchase. The focussed crawler navigates to relevant websites in response to the crawl session created by the scheduler 101. The returned product pages are then parsed to extract product images and textual features. This information is then propagated to the product recognition unit. In accordance with the present invention and to improve the accuracy of the search, product catalogue's images are compared with the product images which have been returned during the parsing. Images of the same product are automatically identified using the methods and systems described below and a streamlined search result is returned to the user who entered the search term. Accordingly, the user can find products from a particular manufacturer effectively. The same product albeit with different images will be presented to the user for simple comparison, for example price comparison, stock availability comparisons. Furthermore for the manufacturer of the product or the retailer of the product, they ensure that the exposure of their product offering is maximised.

In accordance with the present invention a product image is decomposed into a set of frequency components or Intrinsic Mode Functions, IMFs.

Initially the product image is converted to the Hue Saturation and Value colour space. The value channel is then extracted. Letting C be the colour product image with width w and height h and considering the Hue, Saturation and Value (HSV) colour space, the Value channel V of the colour image C is selected as the source image for the proposed methods as described herein. The Value component of the HSV colour space represents the brightness of an image. It is therefore suitable for use in the definition of edge points. It will be appreciated that the HSV colour space corresponds to the way humans perceive colour comparison to RGB, it is more accurate in shadow distinction. However, it will be appreciated that alternative colour spaces may also be applied. For the processes proposed herein a pre-processing analysis of the grayscale image V is performed by utilizing Empirical Mode Decomposition (EMD) to filter the image and extract a more informative component. This informative component is the input for the estimation of local thresholds with the use of Sauvola's thresholding. EMD may be either a one-dimensional or two dimensional EMD.

With a one-dimensional EMD and following the extraction of the Value channel a derivative of Gaussian filter is applied to the extracted value channel. The subsequent images derived from the application of the derivative of Gaussian filter are then decomposed into a first independent mode function representative of the horizontal orientation and a second independent mode function representative of the vertical orientation of the Value channel. EMD is further applied to the response image derived from the derivative of Gaussian filter. In contrast to alternative approaches, the above embodiment decomposes the derivative of Gaussian responses of the grayscale image. Rather than using a two dimensional mask, the above embodiment proposes utilizing EMD applied to a one dimensional signal. With such a one dimensional approach, spatial frequencies are determined for each IMF in the set of IMFs. Spatial frequency analysis comprises estimating spatial frequencies of pixels using, for example, Hilbert Spectral Analysis. The edge pixels of the product image are then detected using either the determined spatial frequencies for each IMF or the local intensity thresholds computed from the previous step with the employment of Sauvola's thresholding. For each detected edge pixel a region of interest is defined as described below. The region of interest is selected by applying a sliding window having a constant size to each edge pixel to determine a set of pixels in the region of the edge pixels. An entropy associated with each of the pixels in the region of edge pixels is then determined. For example, for each grayscale intensity value in the window, corresponding pixels are removed and the entropy of the subset that includes the remaining pixels is estimated. This allows the grayscale intensity that produces the maximum entropy of the subset of pixels in the window to be selected and accordingly only the subset of pixels that is most heterogeneous is selected. Therefore based on the entropy a set of interested pixels is selected. Interested pixels are those pixels which have a maximum entropy.

In an alternative application of EMD, Bidimensional Empirical Mode Decomposition BEMD is applied.

It will be appreciated that EMD is a proper signal processing technique for analysing nonlinear and non-stationary data. It is an adaptive technique and the extraction of the basis is attained based on local characteristics (extrema) of the analysed signal. Bearing in mind the Hilbert transform and the concept of instantaneous frequency the cooperation of these definitions with the EMD forms a powerful tool for time-frequency analysis, named Hilbert-Huang-Transform (HHT). The EMD decomposes a signal into its intrinsic mode functions (IMFs). These components exhibit well behaviour under the Hilbert transform.

In recent years, the EMD has been applied to analyse two-dimensional data such as images. In an embodiment of the invention a modification of Window Empirical Mode Decomposition (WEMD) is used in combination with the improved bidimensional EMD (IEMD). The proposed approach of the BEMD is given below:
1. Initialization. Set $r_0=V$, $i=1$ where V is the grayscale image from the Value channel of the colour product image.
2. Extract all extrema points (maxima-minima) in $r_{i-1}$
3. Calculate the mean signal described as follows:
   a. Initialization: Set the maximal size N of the window and set its original size M to 3.
   b. If the number of maxima is equal with the number of minima in the window M, then compute the mean avg from all pixels appeared in the window of size M, and turn to step (d);
   c. Set $M=M+2$. If $M<N$, turn to step (b), otherwise compute the mean avg from all pixels appeared in the window of size N;
   d. Turn to the next pixel, set $M=3$, turn to step (b), repeat until all pixels of the image are processed, then compute the mean surface $m_{i-1}$;
4. Compute $imf_{i-1}=m_{i-1}$, $r_i=m_{i-1}$, $i=i+1$;
5. Repeat steps (2)-(5) until $i=n$ where n equals to the number of IMFs.

The summation of all the IMFs and the residue image R can reconstruct the original grayscale image V.

$$V = \sum_{I=1}^{n} IMF + R_i \qquad (1)$$

The maximum size N of the window can be determined based on the maxima and minima maps created from the source image. The Euclidean distance to the nearest other local maximum (minimum) point is estimated and denoted as $D_i$ ($D_j$) and the maximum size N of the window is computed by the following equation:

$$N=\max\{\min\{D_i\}\min\{D_j\}\}$$

where min/max{ } denotes the minimum value of the elements in the array{ }.

The extrema points are then defined. Five different types of extrema are proposed. Assuming a square mask window S of odd size the centre pixel $S_{i,j}$ is an extrema if one of the following conditions are fulfilled: First type of extrema:
If $S_{i,j}=S_{i-1,j}=S_{i+1,j}$ and where $$\bigcap_{l=i-1}^{i+1}\bigcap_{q=\pm 1} S_{l,j} > S_{l,j+q} \tag{3}$$

$S_{i,j}$ is a local maximum.
If $S_{i,j}=S_{i-1,j}=S_{i+1,j}$ and $$\bigcap_{l=i-1}^{i+1}\bigcap_{q=\pm 1} S_{l,j} < S_{l,j+q} \tag{4}$$

$S_{i,j}$ is a local minimum.
Second Type of Extrema:
If $S_{i,j}=S_{i,j-1}=S_{i,j+1}$ and $$\bigcap_{l=j-1}^{j+1}\bigcap_{q=\pm 1} S_{i,l} > S_{i+q,l} \tag{5}$$

$S_{i,j}$ is a local maximum.
If $S_{i,j}=S_{i,j-1}=S_{i,j+1}$ and $$\bigcap_{l=j-1}^{j+1}\bigcap_{q=\pm 1} S_{i,l} < S_{i+q,l} \tag{6}$$

$S_{i,j}$ is a local minimum.
Third Type of Extrema:
If $S_{i,j}=S_{i-,j+1}=S_{i+,j-1}$ and $$\bigcap_{d=-1}^{+1}\left(\bigcap_{q=-1}^{+1}\bigcap_{l=-1}^{+1} S_{i+d,j-d} > S_{i+d+q,j-d+l}\right)_{l \neq -q} \tag{7}$$

$S_{i,j}$ is a local maximum.
If $S_{i,j}=S_{i-1,j+1}=S_{i+1,j-1}$ and $$\bigcap_{d=-1}^{+1}\left(\bigcap_{q=-1}^{+1}\bigcap_{l=-1}^{+1} S_{i+d,j-d} < S_{i+d+q,j-d+l}\right)_{l \neq -q} \tag{8}$$

$S_{i,j}$ is a local minimum.
Fourth Type of Extrema:
If $S_{i,j}=S_{i-,j+1}=S_{i+,j-1}$ and $$\bigcap_{d=-1}^{+1}\left(\bigcap_{q=-1}^{+1}\bigcap_{l=-1}^{+1} S_{i+d,j+d} > S_{i+d+q,j+d+l}\right)_{l \neq q} \tag{9}$$

$S_{i,j}$ is a local maximum.

If $S_{i,j}=S_{i-1,j-1}=S_{i+1,j-1}$ and $$\bigcap_{d=-1}^{+1}\left(\bigcap_{q=-1}^{+1}\bigcap_{l=-1}^{+1} S_{i+d,j+d} < S_{i+d+q,j+d+l}\right)_{l \neq q} \tag{10}$$

$S_{i,j}$ is a local minimum.
Fifth Type of Extrema:
If $$\bigcap_{l=-1}^{+1}\bigcap_{q=-1}^{+1} S_{l,j} > S_{i+l,j+q} \tag{11}$$

$S_{i,j}$ is a local maximum.
If $$\bigcap_{l=-1}^{+1}\bigcap_{q=-1}^{+1} S_{l,j} < S_{i+l,j+q} \tag{12}$$

$S_{i,j}$ is a local minimum.

Applying the above to the value channel allows the extraction of intrinsic mode function components. Once the $1^{st}$ IMF component IMF1 is extracted by the application of the above BEMD to the value channel, a local edge detection technique is used. The applied edge detection algorithm is a modified adaptive technique introduced in B. Gatos, I. Pratikakis and S. J. Perantonis, "Adaptive degraded document image binarization," *Pattern recognition*, 2006, 39(3), 317-327. This method deals with degradations which appear due to shadows, non-uniform illumination, low contrast and high signal dependent noise. Moreover, it runs automatically without requiring the adjustment of a set of design parameters need to execution.

In comparison to global threshold methods, this local threshold technique provides improved performance as it utilizes the local area information in order to estimate a threshold value per pixel. Each pixel is classified based on its threshold value into a potential foreground or background class.

Figure 2:
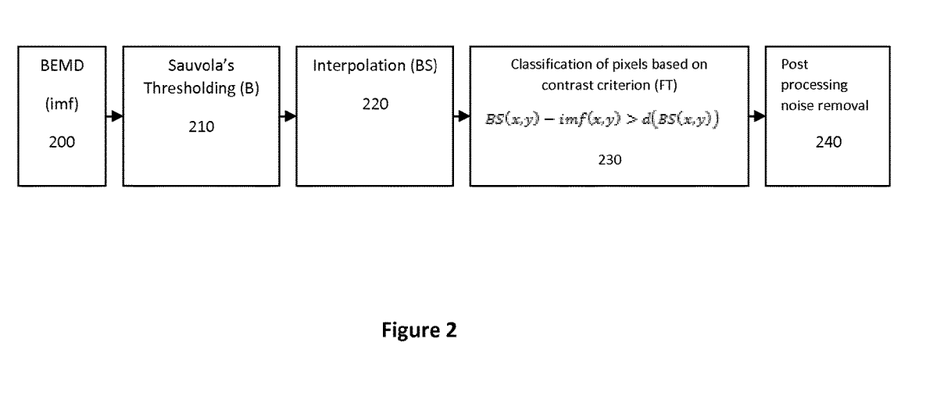

FIG. 2 outlines the edge detection algorithm in accordance with a second embodiment of the invention incorporating the BEMD as described above. In an initial step a pre-processing filtering stage of the grayscale is required by utilizing a low-pass Wiener filter. It will be appreciated that such a filter is usually used for image restoration. However, this step may be skipped since a pre-processing filtering is already achieved through the extraction of the first IMF component. The second step of the proposed algorithm implements a rough classification of pixels into foreground and background clusters. This is attained via the Sauvola's approach as per J. Sauvola and M. Pietikainen, "Adaptive document image binarization," *Pattern Recognition*, 2000, 33, pp. 225-236.

The initial local threshold estimation is given by:

$$T = m + \left(1 - k\left(1 - \frac{s}{R}\right)\right) \tag{13}$$

where m is the mean value of the rectangular window, T is the threshold value for the centre pixel of the window and s is the variance value. R is a constant fixed to 128 and k is set to 0.2 according to [21]. Following the extraction of the first IMF, imf, at step 200, the binary image B is then extracted 210 where 1s' represent the foreground pixels. A background surface BS is then computed 220 by following two rules: For zero pixels in image B the corresponding value at BS image equals to imf corresponding values. For the foreground pixels the corresponding values of the BS image are computed via interpolation described in the following equations:

$$BS(i,j) = imf(i,j) \text{ if } B(i,j)=0 \tag{14}$$

otherwise $$BS(i,j) = \frac{\sum_{ix=i-dx}^{i+dx} \sum_{iy=j-dy}^{j+dy} (imf(ix, iy)(1 - B(ix, iy)))}{\sum_{ix=i-dx}^{i+dx} \sum_{iy=j-dy}^{j+dy} (1 - B(ix, iy))} \tag{15}$$

In a preferred configuration the window size of dx×dy is set to 5×5. The next step of the process involves the final thresholding phase where the binary image FT is estimated 230 taking into account the imf image and the background surface BS. The foreground pixels are determined based on the distance value between the imf image and the background surface BS. According to this method, a threshold d is proposed and a potential foreground pixel is recognized if the calculated distance value exceeds the threshold d value. The final thresholding binary image at each point (x,y) is given by the following equations:

$$FT(x, y) = \begin{cases} 1 & \text{if } BS(x, y) - imf(x, y) > d(BS(x, y)) \\ 0 & \text{otherwise.} \end{cases} \tag{16}$$

The threshold d for each pixel simulates a logistic sigmoid function and it is given by the following equation:

$$d(B(x, y)) = q\delta \left( \frac{(1 - p_2)}{1 + \exp\left(\frac{-4BS(x, y)}{b(1 - p_1)} + \frac{2(1 + p_1)}{(1 - p_1)}\right)} + p_2 \right) \tag{17}$$

where the variable b represents the average background value, the parameter q is equal to 0.6, the $p_1$ is set to 0.5 and $p_2$ to 0.8 according to the adaptive technique outlined above. The variable δ is the average distance between foreground and background values of the pixels and it is expressed by the following formula:

$$\delta = \frac{\sum_x \sum_y (BS(x, y) - imf(x, y))}{\sum_x \sum_y B(x, y)} \tag{18}$$

The next step of the edge detection method includes the post-processing enhancement 240 of the binary image by applying shrink and swells filters. These filters aim to remove isolated pixels and fill potential breaks and gaps.

An alternative and supplementary step for the edge detection includes the application of one-dimensional EMD. The one-dimensional EMD is applied to the response images derived from the derivative of Gaussian filter in horizontal and vertical orientation. Each response image is transformed into one-dimensional signal by concatenating rows or columns depending on the selected orientation. The one-dimensional EMD is attained via Hilbert-Huang Transform approach as per Huang, Norden E., et al., "The empirical mode decomposition and the Hilbert spectrum for nonlinear and non-stationary time series analysis," Proceedings of the Royal Society of London. Series A: Mathematical, Physical and Engineering Sciences 454.1971 (1998): 903-995. After the extraction of the IMFs, the Hilbert Spectral Analysis is responsible for the estimation of the spatial frequencies. A potential edge pixel is recognized if its derivative of Gaussian response is a local maxima and its calculated variation of its spatial frequency relative to its adjacent pixels is below a defined value. It is worthy to mention that local thresholds estimated from the previous step can be used independently or they can be combined with the computed variations of spatial frequencies in order to recognize the edge pixels.

With either the application of 2D EMD or 1D EMD, following the extraction of the edge pixels, a region of interest or set of interested points is detected or selected.

In accordance with the present invention neurobiological findings are taken into consideration. It is well-known that the ganglion cells (GC) constitute the unique output of the retina to the primary visual cortex. In this early neuronal vision component (retina) a pre-processing step is responsible to filter the initial visual information. This phase is required in order to minimize the amount of the transmitted information due to the limited bandwidth of the channel between retina and primary visual cortex. In retina the GCs and the connected receptive fields (RF) are the major components. The RFs of GCs have a centre-surround mechanism. The RF consists of two concentric areas, the centre and the surround that have antagonistic effects on the response of a GC. Consequently, this mechanism sends information regarding two different regions and the brain is responsible to run the "filling-in" mechanism in order to create the scene. Inspired by the biological visual system of mammals in our approach only the interested points of images are taken into consideration for the next processing step. Thus, motivated by the biological vision systems the considered interested points are the edges of images and the surrounded pixels of them. Below follows a detailed description of the selection of the interested points:

Let L={$P_1(x_1,y_1) P_2(x_2,y_2), \ldots, P_n(x_n,y_n)$} be a set of n edge points extracted from the edge detection algorithm. Suppose that $x_i$, $y_i$ are the x-coordinate and y-coordinate respectively of the $i^{th}$ point. Assume a window of constant size k×k. The window is moved/slid to each edge point and interested points in the ($k^2-1$) neighbour points sought. For each edge point a unique window k×k is associated containing $k^2$ potential interested points. It is reasonable to assume that the edge points belong to the set of the interested points. Thus, based on this assumption processing may be confined to only the remaining ($k^2-n$) neighbour points where n equals to the number of edge points in the window. In one embodiment the constant size k of the window is set to 3 however, it is not restricted as such. The entropy is utilized as criterion for the selection of the rest interested points. Let $f_1, f_2, \ldots, f_m$ be the observed grey-level frequencies in the sliding window of the imf image. The percentage of occurrence of a specific grey level $p_i$ equals to $$p_i = \frac{f_i}{k^2}, \sum_{i=1}^{m} f_i = k^2, i = 1, 2, \ldots, m. \tag{19}$$

The entropy H of a set of pixels appeared in the window is defined as $$H = -\sum_{i=1}^{s} p_i \log_2 p_i \qquad (20)$$

where s represents the number of pixels in the set. For each grey level appeared at the window the algorithm removes the corresponding pixels and estimates the entropy of the subset that includes the remaining pixels. In accordance with the invention, the grey level that produces the maximum entropy of the subset of pixels in the window is determined and therefore only the subset of pixels that it is more heterogeneous is selected.

Normalized Quantized Histogram

Colour is one of the essential image indexing features in CBIR. The description of colour information in images can be expressed by the means of colour histograms, colour moments and colour correlograms. In the embodiments described herein a normalized quantized histogram is proposed to create the feature vector of an image. Bearing in mind the performance of our model, the computational time of the retrieval process is one of the keystone design parameters. Thus, it is appropriate to reduce the colour space in order to provide fast indexing even in the cases of use of big databases. This leads to the incorporation of a small set of colours. In a preferred configuration 25 perceptual colours are selected from the RGB colour space. These 25 colours divide the RGB space uniformly. Table 1 presents the quantized RGB colour palette. Additional or alternative features may also be included, e.g., edge orientation histogram, key points and shape information through geometric invariant moments. It is worthy to mention that additional features may be included in the proposed approach.

TABLE 1

| Color | R | G | B |
|---|---|---|---|
| Black | 0 | 0 | 0 |
| Sea green | 0 | 182 | 0 |
| Light green | 0 | 255 | 170 |
| Olive green | 36 | 73 | 0 |
| Aqua | 36 | 146 | 170 |
| Bright green | 36 | 255 | 0 |
| Blue | 73 | 36 | 170 |
| Green | 73 | 146 | 0 |
| Turquoise | 73 | 219 | 170 |
| Brown | 109 | 36 | 0 |
| Blue gray | 109 | 109 | 170 |
| Lime | 109 | 219 | 0 |
| Lavender | 146 | 0 | 170 |
| Plum | 146 | 109 | 0 |
| Teal | 146 | 182 | 170 |
| Dark red | 182 | 0 | 0 |
| Magenta | 182 | 73 | 170 |
| Yellow green | 182 | 182 | 0 |
| Flouro green | 182 | 255 | 170 |
| Red | 219 | 73 | 0 |
| Rose | 219 | 146 | 170 |
| Yellow | 219 | 255 | 0 |
| Pink | 255 | 36 | 170 |
| Orange | 255 | 146 | 0 |
| White | 255 | 255 | 255 |

After the recognition of the interested points of the image, the quantized image Q is created and the normalized quantized histogram is calculated. Given a colour space containing L (25) colour bins the colour histogram of image Q is expressed by:

$$H(x) = \frac{n_x}{N} (x = 1, 2, \ldots, L) \qquad (21)$$

where $n_x$ is the total number of interested points in the x th color bin.

Once the normalized colour historgram has been created, the similarity between colour images is then computed by using the histogram of interested points. In one configuration the Tanimoto coefficient is used as a metric in the comparison. R. O. Duda, P. E. Hart, and D. G. Stork, "Pattern Classification", 2nd ed. Wiley, 2001.

Experimental Results

As proposed herein robust PIR is based on colour histogram of the interested points of product images. A brief description of the process can be summarized as follows:

The RGB query image is transformed to HSV colour space. The Value channel of the query image is selected for the pre-processing filtering step.

Two (2) dimensional EMD is applied to the Value channel and the first IMF component is extracted.

Depending on the EMD used, spatial frequencies or an adaptive local thresholding method is utilized for the recognition of edge points.

Entropy is selected as the criterion for the definition of interested points.

The query image is quantized by utilizing the colour lookup table

The normalized colour histogram of the interested points is created.

The similarity between colour images is computed by using the color histogram of interested points. The Tanimoto coefficient may be used as a metric of the distance.

The proposed low level feature vector has been incorporated in the product recognition platform named "Agora". Tests are derived from a subset of a database containing currently 48,071 Philips product images for the region of Great Britain. It will be appreciated that this database is exemplary only and therefore not restricted as such. The database contains images from different product categories (e.g. ironing, cooking, headphones, etc.) and regions. The PR system can be applied to several types of products from different brands. In association with the PR systems proposed above a text analysis tool is also integrated to validate and recognize products from retrieved images provided by the proposed PIR algorithm. It will be appreciated that such a validation stage is optional. For experimental results only, the first 10 images from the retrieval process are taken into consideration for the recognition of query products and the product is deemed to be recognized only if an image related to the query product is included in the first ten retrieved images.

Five categories from Philips product catalogue are selected and a set of query images for each category is created from products which appear and are listed by Amazon™ retailer. Table II presents the selected categories, the number of existing images in Philips's product catalogue and the percentage of retrieved products.

TABLE 2

| Categories | Amazon Products | Retrieved Products | Percentage | Images in Product Catalogue |
|---|---|---|---|---|
| Ironing | 37 | 34 | 91.89 | 327 |
| Shavers | 23 | 21 | 91.3 | 266 |

TABLE 2-continued

| Categories | Amazon Products | Retrieved Products | Percentage | Images in Product Catalogue |
|---|---|---|---|---|
| Cooking | 11 | 11 | 100 | 63 |
| Headphones | 91 | 89 | 97.8 | 533 |
| Food Preparation | 26 | 25 | 96.15 | 149 |

Figure 3:
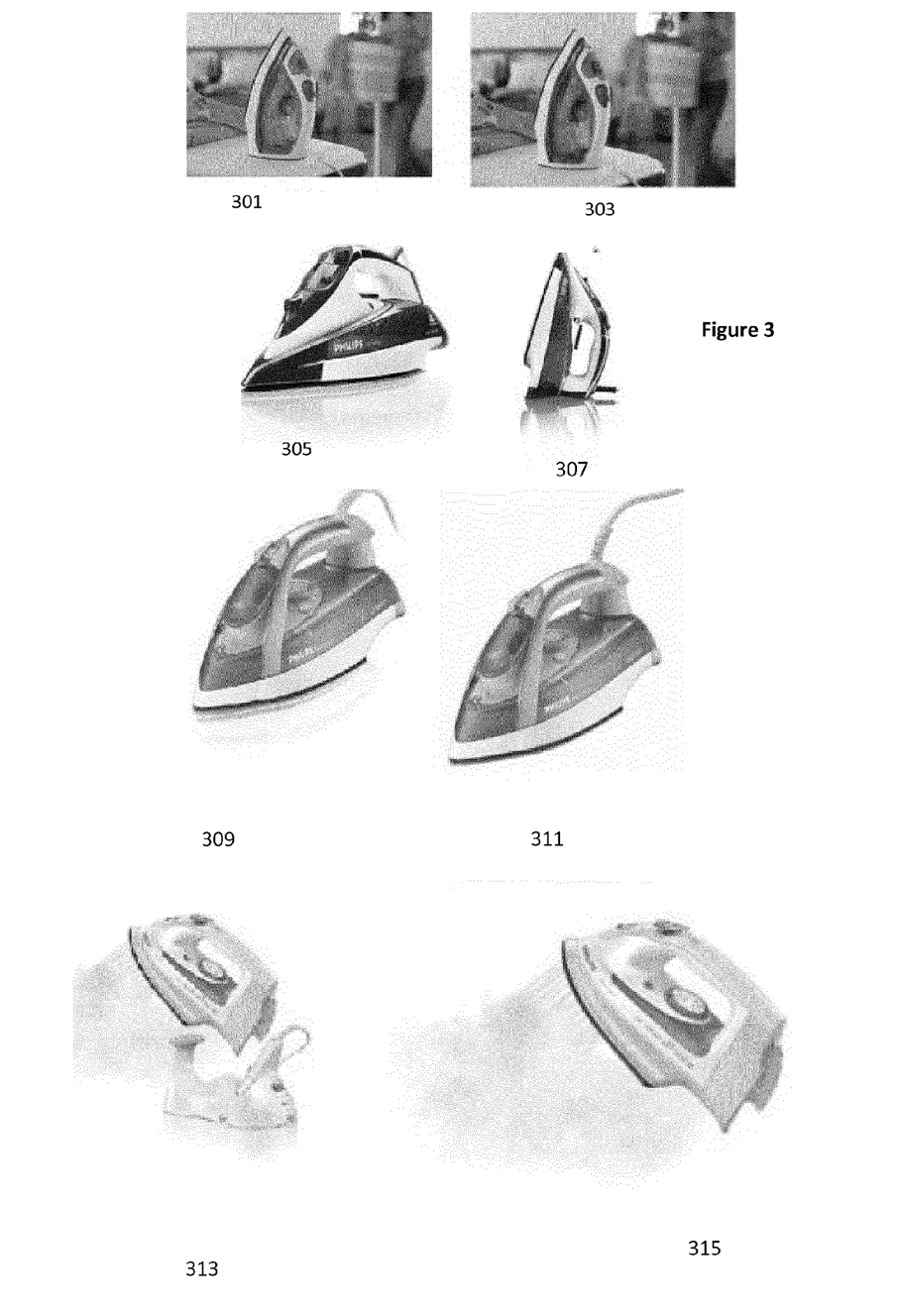
FIG. 3 illustrates matching images recognised in accordance with the present invention

In FIG. 3, as shown, the images on the left 301, 305, 309, 313 of each pair are taken from the manufacturer's product catalogue. Images on the right of each pair 303, 307, 311, 315 are from the matching internet search. In each search pairs of household irons are found. As shown, irons 305, 307 are presented with different angles of rotation. Images 301, 303 have different colour schemes. The power chord of the irons 309, 311 in the third image have different displacements. In the fourth pair, an additional base is shown in the manufacturer's product catalogue image. From the experimental results it can be seen that the methods and system proposed are resilient. Products retrieved which have variations in colour, in display, and in terms of the feature set displayed are matched. It will be appreciated that the colour histogram which is utilised as a feature for indexing image is a statistical feature with low computational cost. As shown, in FIG. 3, the system and method proposed is invariant rotation and scale of image seen and further to any displacement of objects in the image.

Figure 4:
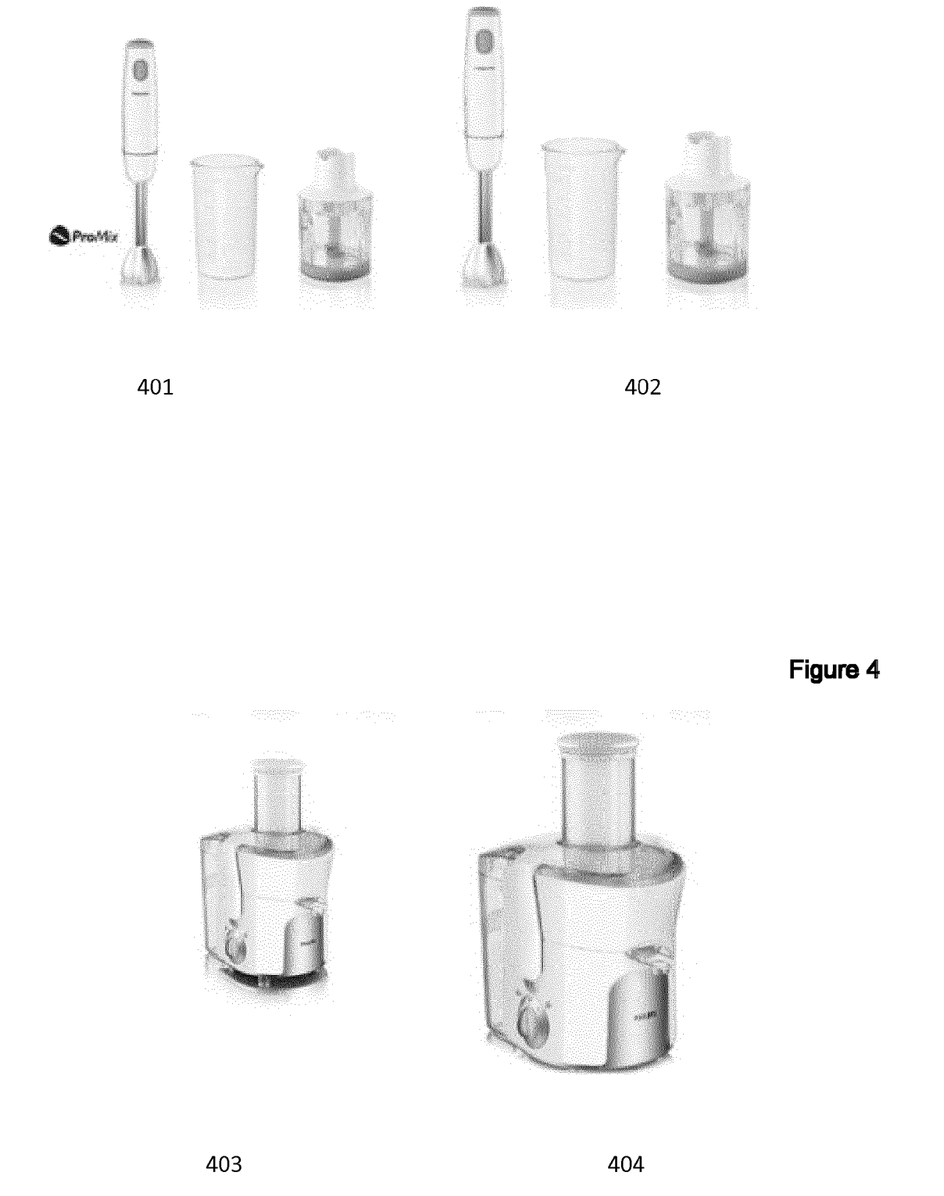
FIG. 4 illustrates further matching images recognised in accordance with the present invention
Figure 5:
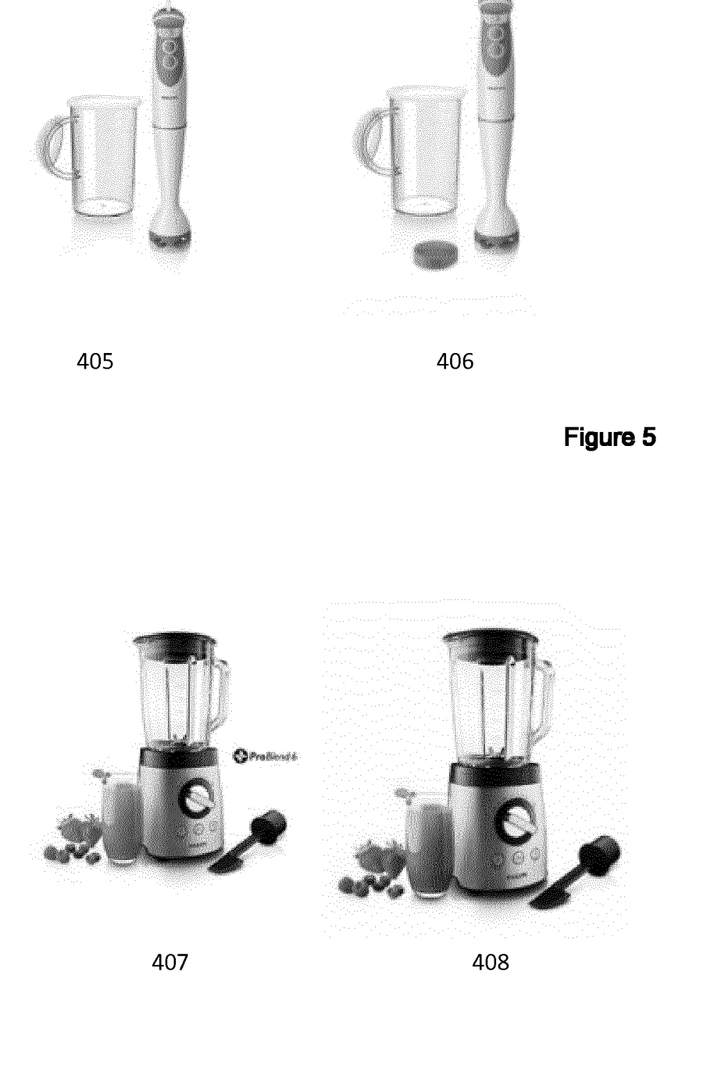
FIG. 5 illustrates further matching process in accordance with the present invention.

FIGS. 4 and 5 illustrate matching from the food preparation category indicated above. As in FIG. 3 in each pair the image on the left-hand side 401, 403, 405, 407 is matched with the image on the right hand side, namely 402, 404, 406, 408. The images on the left 401, 407 include additional trade marking whilst the matched image does not include such a feature. Similarly various sizes of products, such as those shown in the bottom left hand image 403, 404 are matched.

It is evident that the product recognition proposed herein robust in that additional lettering included in the image, additional objects, scale of image, and rotation does not affect the outcome of the matching process.

Figure 6:
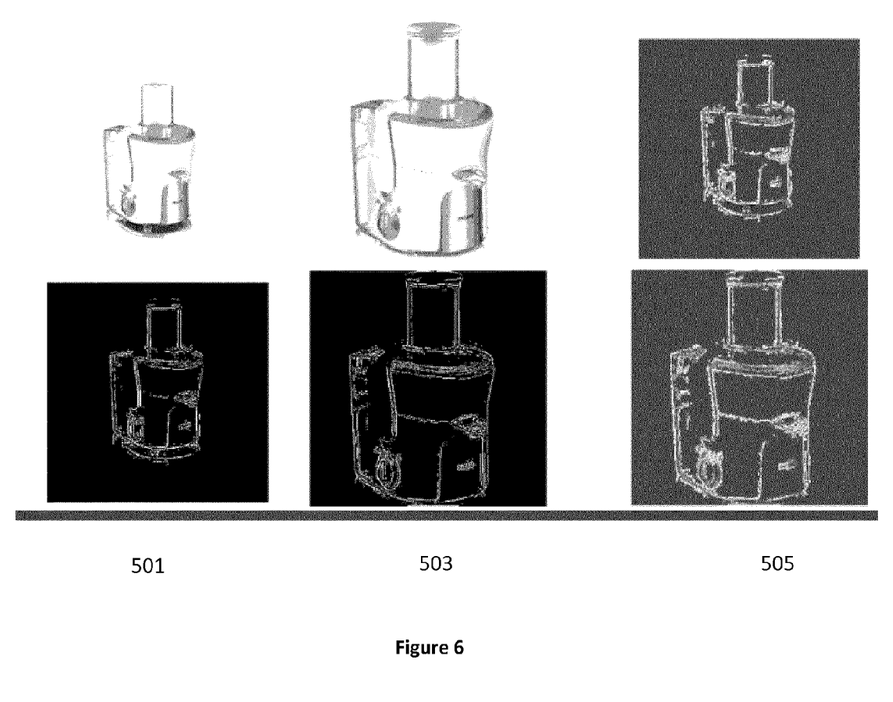
FIG. 6 illustrates and edge detection and matching process in accordance with the present invention.

FIG. 6 further illustrates the edge detection for the pairing 403, 404 of FIG. 4. The quantized images 501, the edges 503 and the interested points 505 for both images 403, 404 are depicted.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail.

The words "comprises/comprising" and the words "having/including" when used herein with reference to the present invention are used to specify the presence of stated features, integers, steps or components but does not preclude the presence or addition of one or more other features, integers, steps, components or groups thereof. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A method of product recognition, comprising
   decomposing a product image into a set of frequency components;
   performing a frequency analysis for each frequency component in the set of frequency components;
   detecting a plurality of edge pixels of the image based on the frequency analysis;
   selecting a set of interested pixels in the region of each of the plurality of edge pixels;
   creating a quantized product image; and
   creating a normalized histogram of the quantized product image using the sets of interested pixels selected for each of the plurality of edge pixels, wherein product recognition is based on similarities between the normalized histogram of the quantized product image and images of similar products in a database of products.

2. The method of claim 1 wherein performing a frequency analysis comprises obtaining local intensity thresholds and spatial frequencies for each frequency component in the set of frequency components.

3. The method of claim 2 wherein decomposing the product image comprises:
   converting the quantized product image to a Hue, Saturation and Value colour space;
   extracting a Value channel of the Hue, Saturation and Value colour space;
   applying a derivative of Gaussian filter to the extracted Value channel; and
   decomposing the images derived from the application of the derivative of Gaussian filter in a horizontal and vertical orientation into a first intrinsic mode function representative of the horizontal orientation and a second intrinsic mode function representative of the vertical orientation of the Value channel.

4. The method according to claim 3 wherein obtaining spatial frequencies for each frequency component further comprises estimating a spatial frequency for each pixel associated with each intrinsic mode function and wherein detecting the plurality of edge pixels is based either on local intensity thresholds or the estimated spatial frequencies.

5. The method of claim 3 wherein selecting the set of interested pixels comprises:
   for each of the plurality of edge pixels:
   applying a window having a constant size to each edge pixel to determine a set of pixels in the region of the edge pixel;
   calculating an entropy associated with each of the pixels in the set of edge pixels;
   selecting the set of interested pixels having maximum entropy.

6. The method of claim 5 wherein decomposing the images derived from the application of derivative of Gaussian filter further comprises applying Empirical Mode Decomposition, EMD, to a response image from derivative of Gaussian filter.

7. The method according to claim 5 wherein detecting the plurality of edge pixels of the image comprises detecting a plurality of extrema in each intrinsic mode function.

8. The method according claim 1 wherein creating the quantized product image comprises quantizing the product image using a set of perceptual colours.

9. The method according claim 3 wherein detecting the plurality of edge pixels further comprises pre-processing the value channel.

10. The method according to claim 9 further comprising classifying a plurality of edge pixels associated with the value channel into a plurality of foreground and background clusters.

11. The method according to claim 10 wherein classifying comprises applying Sauvola's thresholding to the value channel to extract a binary image.

12. The method according to claim 11 wherein a final image is estimated based on a distance value between the binary image and a background surface.

13. A non-transitory computer readable programmable medium carrying a computer programme stored thereon which when executed by a processor implements the method according to claim 1.

14. An apparatus for product recognition, comprising
means for decomposing a product image of into a set of frequency components; means for performing a frequency analysis for each frequency component in the set of frequency components;
means for detecting a plurality of edge pixels of the image based on the frequency analysis;
means for selecting a set of interested pixels in the region of each of the plurality of edge pixels;
means for creating a quantized product image; and
means for creating a normalized histogram of the quantized product image using the sets of interested pixels selected for each of the plurality of edge pixels, wherein product recognition is based on similarities between the normalized histogram of the quantized product image and images of similar products in a database of products.

15. A system for product recognition comprising the apparatus according to claim 14.

16. A method of product recognition, comprising
decomposing a product image into a set of frequency components, wherein decomposing the product image includes:
converting the product image to a Hue, Saturation and Value color space;
extracting a Value channel of the Hue, Saturation and Value color space;
applying a derivative of Gaussian filter to the extracted Value channel; and
decomposing the images derived from the application of the derivative of Gaussian filter in a horizontal and vertical orientation into a first intrinsic mode function representative of the horizontal orientation and a second intrinsic mode function representative of the vertical orientation of the Value channel;
performing a frequency analysis for each frequency component in the set of frequency components, wherein performing a frequency analysis comprises obtaining local intensity thresholds and spatial frequencies for each frequency component in the set of frequency components, wherein obtaining spatial frequencies for each frequency component further comprises estimating a spatial frequency for each pixel associated with each intrinsic mode function;
detecting a plurality of edge pixels of the image based on the frequency analysis, wherein detecting the plurality of edge pixels is based either on local intensity thresholds or the estimated spatial frequencies;
selecting a set of interested pixels in the region of each of the plurality of edge pixels, wherein selecting the set of interested pixels comprises:
for each of the plurality of edge pixels:
applying a window having a constant size to each edge pixel to determine a set of pixels in the region of the edge pixel;
calculating an entropy associated with each of the pixels in the set of edge pixels; and
selecting the set of interested pixels having maximum entropy;
creating a quantized product image; and
creating a normalized histogram of the quantized product image using the sets of interested pixels selected for each of the plurality of edge pixels, wherein product recognition is based on similarities between the normalized histogram of the quantized product image and images of similar products in a database of products.

* * * * *